Figure 1:
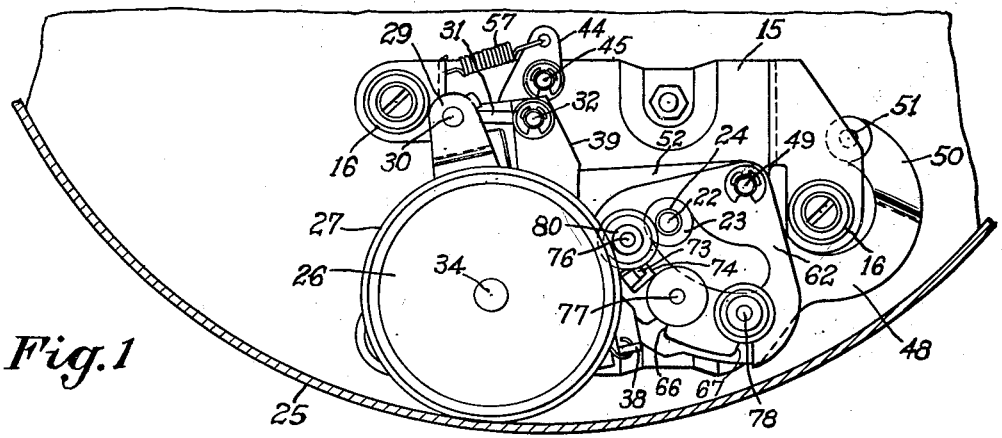

Feb. 17, 1953     A. F. DEMING     2,628,504
PLURAL SPEED CHANGER MOTOR FOR PHONOGRAPH TURNTABLES
Filed March 2, 1951     3 Sheets—Sheet 1

Inventor
Andrew F. Deming
By Frease, Bishop & Hamilton
Attorneys

Feb. 17, 1953    A. F. DEMING    2,628,504
PLURAL SPEED CHANGER MOTOR FOR PHONOGRAPH TURNTABLES
Filed March 2, 1951    3 Sheets-Sheet 2

Inventor
Andrew F. Deming
By Frease, Bishop & Hamilton
Attorneys

Feb. 17, 1953          A. F. DEMING          2,628,504
PLURAL SPEED CHANGER MOTOR FOR PHONOGRAPH TURNTABLES
Filed March 2, 1951          3 Sheets-Sheet 3
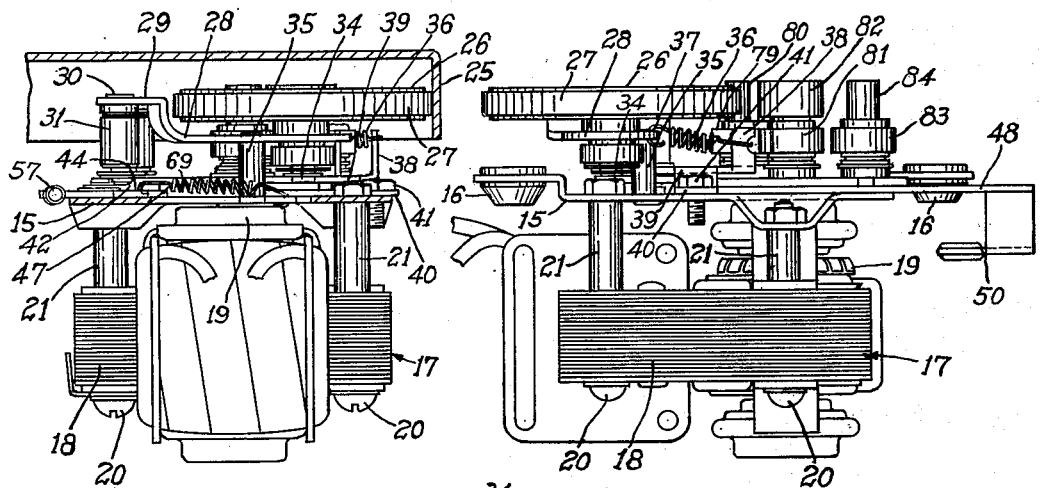
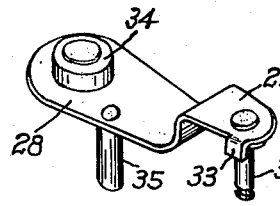
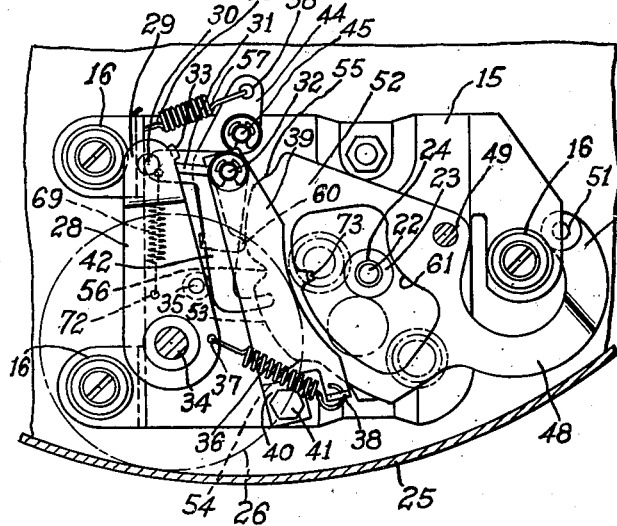
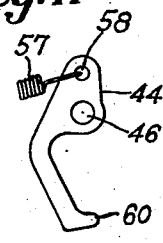
Inventor
Andrew F. Deming
By Frease, Bishop & Hamilton
Attorneys Patented Feb. 17, 1953

2,628,504

UNITED STATES PATENT OFFICE 2,628,504

PLURAL SPEED CHANGER MOTOR FOR PHONOGRAPH TURNTABLES

Andrew F. Deming, Alliance, Ohio, assignor to The Alliance Manufacturing Company, Alliance, Ohio, a corporation of Ohio Application March 2, 1951, Serial No. 213,608

13 Claims. (Cl. 74—199)

1

The invention relates to driving mechanism for phonograph turntables, and more particularly to means for driving a turntable at either one of a plurality of selected speeds.

The present application is an improvement upon a three speed changer motor for phonograph turntables now being made by applicant's assignee, in which three intermediate pulleys of different diameters are adapted to be selectively interposed between the motor shaft, or drive pulley thereon, and an idler wheel which frictionally engages the rim of the turntable, in order to selectively rotate the turntable at 78.26 R. P. M., 45 R. P. M. or 33⅓ R. P. M. so that any of the three types of phonograph records presently in common use may be played at proper speed, as desired.

An objection to this three speed motor changer is that, in the actual use of the same, it has been found that there are a number of positions, other than the desired drive positions, in which an intermediate pulley may be in driving contact with the motor shaft, or drive pulley thereon, and the idler wheel, thus making it possible for the user to unknowingly find false positions for operation which rotate the turntable at improper driving speeds and do not deliver the full torque necessary to change records or to properly play the individual records.

The invention therefore contemplates the provision of means for permitting driving engagement between the motor shaft and idler wheel, through any desired one of a plurality of intermediate pulleys, only when the parts are in the desired drive positions, thus rendering it impossible to secure driving engagement except at the selected speeds.

Another object is to provide a multiple speed changer motor in which a plurality of intermediate pulleys of different diameters are carried upon a movable turret plate, and means is provided for moving the idler wheel away from the turret plate when the turret plate is shifted from one position to another and holding the idler wheel out of contact with the intermediate pulleys until the turret plate is moved into the desired driving position.

Still another object is to provide such a device in which means is provided for latching the turret plate in each of the several selected drive positions and for holding the idler wheel out of contact with the intermediate pulleys in all non-latched positions.

A further object is to provide such a plural speed changer motor in which the idler plate,

2 which carries the idler wheel, has a stud thereon, for engagement with the turret plate latch arm at all times when said arm is in non-latched position, with means for retracting the turret plate latch arm by the shifter lever latch arm upon engaging the stud on the idler plate to disengage the idler wheel.

It is also an object of the invention to provide such a plural speed changer motor in which means is provided for latching the shifter lever in each of the several selected drive positions at the same time that the turret plate is latched in a selected drive position.

Another object is to provide a device of the character referred to having a shifter lever for manual shifting of the parts to the various drive positions, a shifter lever latch arm for latching the shifter lever in drive positions, a turret plate operatively connected to the shifter lever and having a plurality of intermediate pulleys mounted thereon, and a turret plate latch arm for latching the turret plate in the various drive positions.

A further object is to provide such mechanism in which both the shifter lever and the turret plate have arcuate edges having spaced notches therein for latching engagement with the respective latch arms, so that those latch arms ride upon the respective arcuate edges of the shifter lever and turret plate during all non-latched positions.

Figure 2:
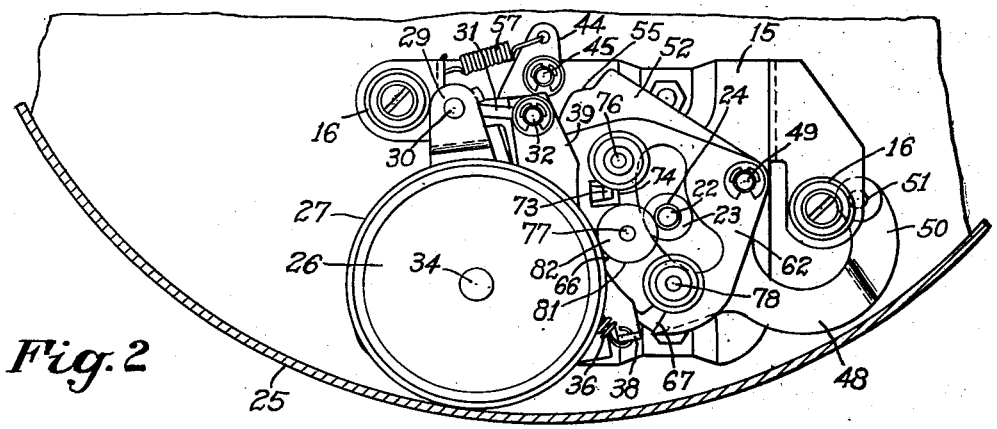
Figure 3:
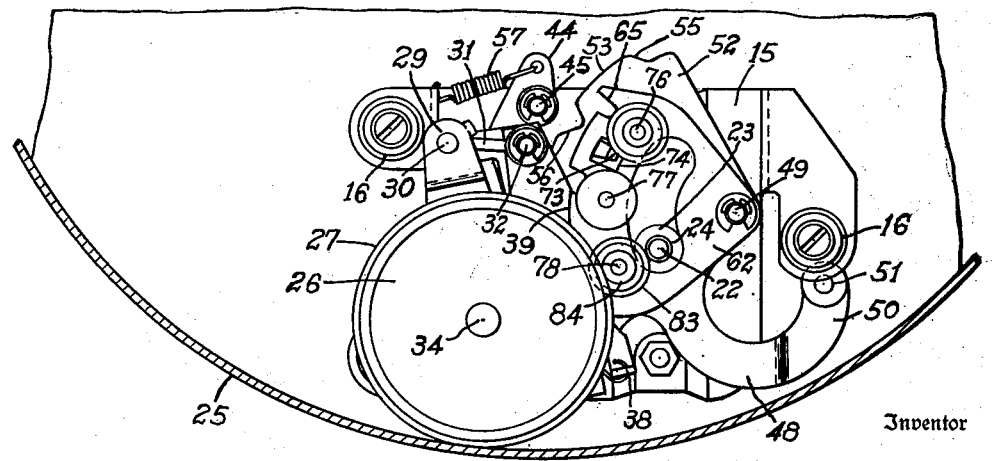
Figure 4:
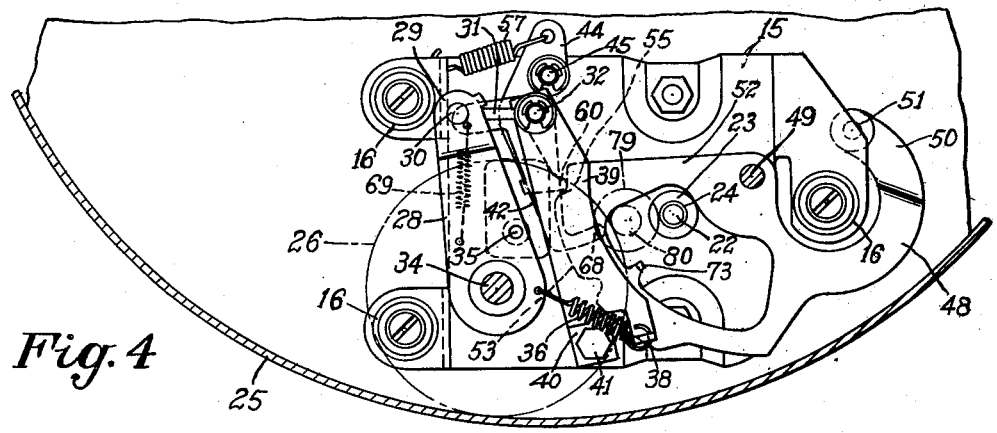
Figure 5:
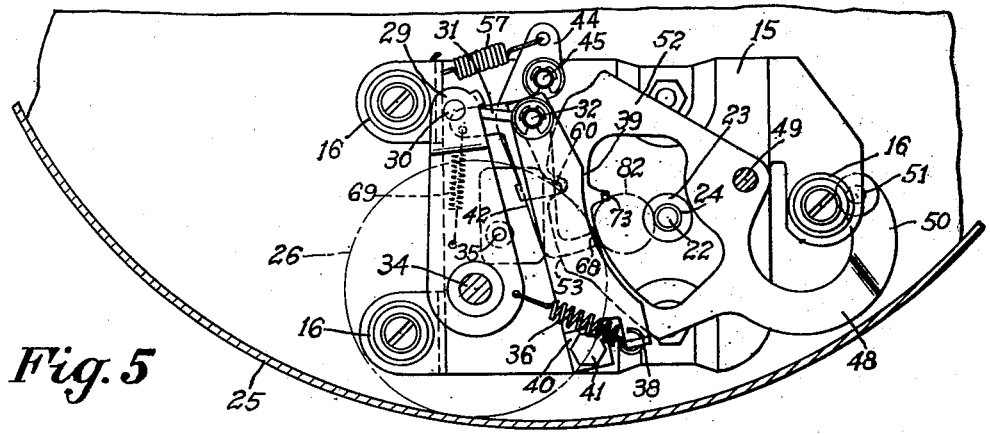
Figure 6:
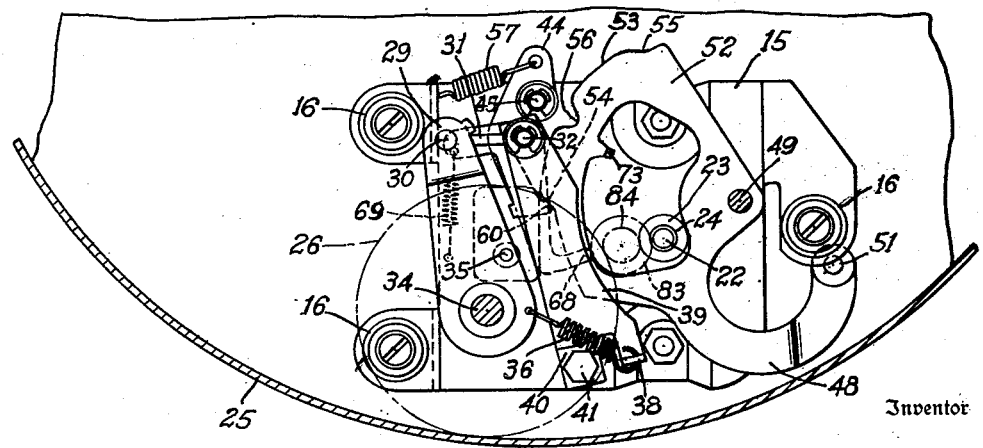

The above objects together with others which will be apparent from the drawings and following description, or which may be later referred to, may be attained by constructing the improved plural speed changer motor for phonograph turntables in the manner hereinafter described in detail and illustrated in the accompanying drawings, in which;

Figure 1 is a top plan view of the improved plural speed changer motor, showing a portion of the rim of a turntable associated therewith, the parts being shown in latched position for driving the turntable at a speed of 33⅓ R. P. M.;

Fig. 2 a similar view showing the parts in position to rotate the turntable at a speed of 78.26 R. P. M.;

Fig. 3 a view similar to Figs. 1 and 2 showing the parts latched in position for rotating the turntable at a speed of 45 R. P. M.;

Fig. 4 a plan sectional view with the idler wheel and turret plate removed, showing the parts in the position shown in Fig. 1;

Fig. 5 a view similar to Fig. 4, with the parts in the position shown in Fig. 2;

Fig. 6 a view similar to Figs. 4 and 5 with the parts in the position shown in Fig. 3;

Fig. 7 a plan sectional view, showing the manner in which the idler wheel is held out of engagement with the intermediate pulleys in all non-latched positions of the shifter lever;

Fig. 8 a side elevation of the improved plural speed changer motor;

Fig. 9 an end elevation of the improved plural speed changer motor;

Fig. 10 a detached, perspective view of the idler plate, showing the stud thereon which forms an important part of the invention;

Fig. 11 a detached top plan view of the turret plate, with the assembly of intermediate pulleys thereon;

Fig. 12 a detached, plan view of the shifter lever latch arm; and,

Fig. 13 a detached, plan view of the turret plate latch arm.

Referring now more particularly to the embodiment of the invention illustrated in the accompanying drawings, in which similar numerals refer to similar parts throughout, the improved plural speed changer motor and associated turntable operating mechanism are mounted as a unit upon a mounting plate 15, adapted to be seated upon and secured to the usual platform (not shown) of the cabinet, or other support for the phonograph, as by conventional rubber grommets indicated at 16.

The motor, indicated generally at 17, may be any suitable type of small motor, such for instance as the two pole, shaded pole type motor disclosed in Schneider Patent No. 2,261,889, dated November 4, 1941, comprising generally the field member, or stator, 18, and the rotor 19, and is suspended from the mounting plate 15 by a plurality of depending tie-bolts 20, surrounded by suitable spacer sleeves 21, located between the top of the stator and the underside of the mounting plate.

The shaft 22, of the rotor 19, of the motor, is extended upward through the mounting plate 15, and journalled in a suitable bushing or bearing 23, and may have a small diameter driving pulley 24 fixed thereon, although, if desired, this driving pulley may be eliminated and the rotor shaft made of suitable diameter to have driving contact with the several intermediate pulleys, which will be later described.

A turntable of usual construction is journalled upon the platform (not shown) of the cabinet, in conventional manner, and a portion of the peripheral rim flange of such turntable is shown at 25, and as in usual and well known manner, the turntable is adapted to be rotated by an idler wheel 26, having a tire 27 of rubber, or other suitable friction material.

This idler wheel 26, as is customary in turntable drive mechanism, is carried by a movable idler plate, which in the present instance is in the form of an elongated idler plate 28, having one end portion upwardly offset, as at 29, and journalled, by stud 30, in the idler link 31 which is fulcrumed upon the post 32, which is rigidly mounted upon the upper side of the mounting plate 15.

A depending lug 33 is provided upon one edge portion of the idler plate 28, adjacent to the journal point 30 thereof, and adapted to contact the idler link 31, to limit movement of the idler plate in one direction.

A bearing 34 is fixed upon the upper side of the free end portion of the idler plate 28 and forms a journal for the idler wheel 26. An important feature of the present invention is the depending stud 35, fixed to the underside of the idler plate 28, said stud being shown in the drawings as located near one edge of the idler plate. The purpose and operation of this stud 35, will be later explained in detail.

Normally, the friction tire 27, of the idler wheel 26, is urged into frictional contact with the inner surface of the depending rim flange 25 of the turntable, by means of a coil spring 36, having one end thereof connected to the idler plate 28, as indicated at 37, and the opposite end connected to an upstanding lug 38, formed at one end portion of the hold-down plate 39.

This hold-down plate has one end portion offset downwardly as at 40, and rigidly connected to the mounting plate 15, as by a screw 41, so that the body portion of the hold-down plate is spaced above the mounting plate 15, as best shown in Figs. 8 and 9. The other end portion of the hold-down plate is secured to the mounting plate by means of the post 32, upon which the idler link 31 is journalled.

Beneath the hold-down plate 39, the turret plate latch arm 42 is fulcrumed upon the post 32, by means of the aperture 43 in said turret plate latch arm, and the shifter lever latch arm 44 is located beneath the turret plate latch arm and fulcrumed upon the stud 45 mounted in the mounting plate 15, as by means of the aperture 46 in said shifter lever latch arm.

A depending lug 47 is formed upon the turret plate latch arm and overhangs the adjacent end of the shifter lever latch arm 44. The shifter lever 48 is fulcrumed upon the stud 49, mounted on the upper side of the mounting plate 15, and provided with the downwardly offset end portion 50, having an aperture 51 therein for connection to any suitable linkage (not shown) leading to a suitable operating lever on the panel of the phonograph for shifting to any one of the three speeds as will be later described in detail.

The shifter lever 48 has an enlarged, segmental portion 52, the arcuate edge portion 53 of which is located beneath the hold-down plate 39, and the turret plate latch arm 42, in the same horizontal plane with the shifter lever latch arm 44. This arcuate edge 53 of the shifter lever terminates at opposite ends in the shoulders 54 and 55 and is provided with a central notch 56.

A coil spring 57 is connected at one end to the outer end of the shifter lever latch arm 44, as indicated at 58, and at its other end to the mounting plate 15, as indicated at 59, for normally urging the pawl 60 of the shifter lever latch arm into contact with the arcuate edge 53 of the shifter lever.

A generally arcuate opening 61 is formed in the segmental portion 52 of the shifter lever, so as to permit free movement of the shifter lever upon the stud 49 without contacting the motor shaft 22.

The turret plate, or pulley plate, 62 is of segmental shape and provided with the elongated opening 63, by means of which it is movably pivoted upon the post 49, on top of the segmental portion of the shifter lever so as to be independently movable, to some extent, relative thereto.

The arcuate edge portion 64 of the turret plate is slidably located beneath the hold down plate 39, in the same horizontal plane with the turret plate latch arm 42, and is provided with three spaced notches indicated at 65, 66 and 67, located at one end, the center, and the other end of said arcuate edge respectively, for selective engagement by the pawl 68 upon the turret plate latch arm 42, as will be later described in detail.

A coil spring 69 is connected at one end, as indicated at 70, to the angular arm 71 of the turret plate latch arm 42, the other end of said coil spring being connected to the mounting plate 15, as indicated at 72, for urging the pawl 68 into contact with the arcuate edge 64 of the turret plate.

For the purpose of swinging the turret plate 62 upon its pivot 49, an upwardly disposed lug 73 is formed upon the segmental portion 52 of the shifter lever and engaged in an opening 74 in the turret plate in which said lug has some play.

An arcuate slot 75 is formed in the turret plate so that it may be oscillated upon its pivot without interference by the motor shaft 22. A plurality of intermediate pulleys are journalled upon the upper side of the turret plate, each of these pulleys having a friction surfaced portion for contact with the motor shaft 22, or the pulley 24 if provided thereon, and with a metal surfaced portion for selective engagement with the friction surface 27 of the idler wheel 26.

These pulleys are freely rotatable upon the posts 76, 77 and 78, fixed upon the upper side of the turret plate in spaced relation and in arcuate arrangement as shown in the drawings.

The intermediate pulley at one end comprises the rubber or other friction material pulley portion 79, for contact with the motor shaft, or drive pulley, to the upper side of which is fixed the metal pulley portion 80, of reduced diameter, adapted to contact the friction tire 27 of the idler wheel 26 for driving the turntable at a speed of 33⅓ R. P. M.

Upon the central stud or post 77 is journalled the second of the intermediate pulleys, having the rubber, or other friction material, pulley portion 81, for contact with the motor shaft, or drive pulley thereon as desired, above which is located the relatively large metal pulley portion 82, for contact with the idler wheel 26, to drive the turntable at a speed of 78.26 R. P. M.

Upon the post 78 is journalled the third of the intermediate pulleys, having the lower friction material portion 83, for contact with the motor shaft, or drive pulley thereon, and the upper metal portion 84, for contact with the idler wheel 26 for driving the turntable at a speed of 45 R. P. M.

Thus, by shifting the turret plate to the proper position to engage the desired one of the intermediate pulleys with the motor shaft and the idler wheel, the turntable may be driven at any one of the above mentioned speeds, so that all types of phonograph records, such as are now commonly in use, may be played at proper speed.

It should be understood that while three different intermediate pulleys are shown, for driving the turntable at any one of three predetermined speeds, the invention is not restricted to these three particular speeds, but is applicable to a speed changer mechanism for selectively rotating a turntable at any desired number of speeds.

The three speeds for which the invention is illustrated and described are used as an illustration, because of the fact that these are the three speeds for which phonograph records are now generally made.

In the operation of the improved speed changer motor as designed for these three particular speeds, assuming that it is desired to play a record adapted for 33⅓ R. P. M., the shifter lever 48 is swung to the position shown in Figs. 1, 4 and 8, bringing the rubber or other friction material pulley portion 79 into engagement with the motor shaft 22 or drive pulley 24 thereon as the case may be, and simultaneously bringing the corresponding metal pulley portion 80 into frictional contact with the rim of the idler wheel 26, which in turn is held in frictional contact with the rim flange 25 of the turntable.

In this position the pawl 60, of the shifter lever latch arm, is in contact with the shoulder 55, at one end of the arcuate edge 53 of the segmental portion 52 of the shifter lever 48, and the pawl 68, of the turret plate latch arm 42, is in contact with the notch 65 in the arcuate edge of the turret plate.

In this position it will be seen that the turret plate 62 and the shifter lever 48 are both latched against pivotal movement upon the post 49. When the shifter lever 48 is moved to shift the turret plate, so as to bring another one of the intermediate pulleys into contact with the motor shaft and the idler wheel, the moment the shifter lever is moved the pawls 60 and 68 of the shifter lever latch arm 44, and the turret plate latch arm 42, respectively, will ride onto the arcuate edges 53 and 64 of the shifter lever and turret plate respectively, and the idler plate 28 will be swung on its pivot, by engagement of the stud 35 thereon with the adjacent edge of the turret plate latch arm, 42, as shown in Fig. 8, so that, as clearly seen in this figure, the idler wheel 26 is moved out of contact with all of the intermediate pulleys 80, 82 and 84, and this is the position the parts assume in all unlatched positions.

When it is desired to drive the turntable at a speed of 78.26 R. P. M., the shifter lever 48 is moved to the position shown in Figs. 2 and 5, bringing the friction material pulley portion 81 into contact with the motor shaft, or drive pulley thereon.

In this position the pawl 60, of the shifter lever latch arm 44, will engage the central notch 56 of the shifter lever segment 52, and the pawl 68 of the turret plate latch arm 42 will engage the central notch 66 of the turret plate 62, permitting the idler plate 28 to be pulled by its spring 36 into position to bring the rim of the idler wheel 26 into frictional contact with the intermediate pulley 82.

The parts are thus latched in this position by means of the pawls 60 and 68 engaging the respective notches in the shifter lever and turret plate, and the turntable will be driven at a speed of 78.26 R. P. M.

To drive the turntable at a speed of 45 R. P. M., the shifter lever 48 is moved to the position shown in Figs. 3 and 6, moving all of the parts to the positions shown in these two figures. As above pointed out, it will be seen that as soon as the pawls 60 and 68, of the shifter lever latch arm 44 and turret plate latch arm 42 respectively, are moved out of engagement with the notches in the shifter lever and turret plate they will ride upon the arcuate edges 53 and 64 respectively of these two parts, and through the stud 35 will move the idler wheel plate in a direction to move the idler wheel 26 out of engagement with the intermediate pulleys, as the intermediate pulley 81—82 is moved out of contact with the motor shaft; and the pulleys will be held disengaged until the friction material pulley 83 contacts the motor shaft, as shown in Figs. 3 and 6, at which time the shifter lever latch arm 44 and the turret plate latch arm 42 will be moved into latched position, permitting the idler wheel 26 to move into contact with the intermediate pulley 84, all as shown in Figs. 3 and 6.

In this position the pawl 60 of the shifter lever latch arm 44 will be located against the shoulder 54, of the segment 52 of the shifter lever 48, and the pawl 68 of the turret plate latch arm 42 will be engaged in the notch 67 of the turret plate 62, holding the parts in latched position so that the turntable will be rotated at a speed of 45 R. P. M.

From the above it will be seen that the motor shaft cannot be operatively connected to the idler wheel 26, in any false position, through any one of the intermediate pulleys, so that no improper driving speeds can be obtained which do not deliver full torque necessary to change records and to play individual records.

It will be clear from the drawings and above description that, as the speed is changed the turret plate latch arm is retracted by the shifter lever latch arm, and upon engaging the idler plate stud 35, disengages the idler wheel, and holds the idler wheel in the disengaged position in all non-latched positions of the shifter lever and turret plate, thus permitting driving connection between the motor shaft, an intermediate pulley and the idler wheel, only in latched positions of the parts.

According to the provisions of the patent statutes, I have explained the principle of my invention and described one embodiment thereof, but I desire to have it understood that within the scope of the appended claims, the invention may be practiced otherwise than as specifically illustrated and described, the invention residing primarily in the provision of a plural speed changer motor provided with means for latching the parts in a plurality of driving positions and for making it impossible to secure driving engagement in any non-latched position of the parts.

I claim:

1. A plural speed changer motor for a flanged turntable, a shaft upon the motor, a turret plate movable relative to the motor, a plurality of intermediate pulleys journalled upon the turret plate, means for moving the turret plate for moving the intermediate pulleys into selective contact with the motor shaft, means for latching the turret plate against movement when each intermediate pulley contacts the motor shaft, an idler plate movable relative to the turret plate, an idler wheel journalled upon the idler plate for contact with the turntable flange and for selective contact with the intermediate pulleys, and means between said latching means and the idler plate for moving the idler plate to move the idler wheel out of contact with the intermediate pulleys when the turret plate is in non-latched position.

2. A plural speed changer motor for a flanged turntable, a shaft upon the motor, a turret plate pivotally mounted relative to the motor, a plurality of intermediate pulleys journalled upon the turret plate, means for moving the turret plate upon its pivot for moving the intermediate pulleys into selective contact with the motor shaft, means for latching the turret plate against movement when each intermediate pulley contacts the motor shaft, an idler plate movable relative to the turret plate, an idler wheel journalled upon the idler plate for contact with the turntable flange and for selective contact with the intermediate pulleys, and means between said latching means and the idler plate for moving the idler plate to move the idler wheel out of contact with the intermediate pulleys when the turret plate is in non-latched position.

3. A plural speed changer motor for a flanged turntable, a shaft upon the motor, a turret plate movable relative to the motor, a plurality of intermediate pulleys journalled upon the turret plate, means for moving the turret plate for moving the intermediate pulleys into selective contact with the motor shaft, a turret plate latch arm for latching the turret plate against movement when each intermediate pulley contacts the motor shaft, an idler plate movable relative to the turret plate, an idler wheel journalled upon the idler plate for contact with the turntable flange and for selective contact with the intermediate pulleys, and means between said turret plate latch arm and the idler plate for moving the idler plate to move the idler wheel out of contact with the intermediate pulleys when the turret plate is in non-latched position.

4. A plural speed changer motor for a flanged turntable, including a mounting plate, a motor carried by the mounting plate and having a shaft, a turret plate movably mounted upon the mounting plate, a plurality of intermediate pulleys journalled upon the turret plate, means for moving the turret plate for moving the intermediate pulleys into selective contact with the motor shaft, there being spaced notches in the turret plate, corresponding in number and location to said intermediate pulleys, a turret plate latch arm mounted upon the mounting plate for engagement in said notches for latching the turret plate against movement when each intermediate pulley contacts the motor shaft, an idler plate movably mounted upon the mounting plate, an idler wheel journalled upon the idler plate for contact with the turntable flange and for selective contact with the intermediate pulleys, and cooperating means upon the idler plate and the turret plate latch arm for moving the idler wheel out of contact with the intermediate pulleys when the turret plate is in non-latched position.

5. A plural speed changer motor for a flanged turntable, including a mounting plate, a motor carried by the mounting plate and having a shaft, a turret plate pivotally mounted upon the mounting plate, a plurality of intermediate pulleys journalled upon the turret plate, means for moving the turret plate upon its pivot for moving the intermediate pulleys into selective contact with the motor shaft, there being spaced notches in the turret plate, corresponding in number and location to said intermediate pulleys, a turret plate latch arm mounted upon the mounting plate for engagement in said notches for latching the turret plate against movement when each intermediate pulley contacts the motor shaft, an idler plate movably mounted upon the mounting plate, an idler wheel journalled upon the idler plate for contact with the turntable flange and for selective contact with the intermediate pulleys, and cooperating means upon the idler plate and the turret plate latch arm for moving the idler wheel out of contact with the intermediate pulleys when the turret plate is in non-latched position.

6. A plural speed changer motor for a flanged turntable, including a mounting plate, a motor carried by the mounting plate and having a shaft, a turret plate movably mounted upon the mounting plate, a plurality of intermediate pulleys journalled upon the turret plate, means for moving the turret plate for moving the intermediate pulleys into selective contact with the motor shaft, there being spaced notches in the turret plate, corresponding in number and location to said intermediate pulleys, a turret plate latch arm pivotally mounted upon the mounting plate for engagement in said notches for latching the turret plate against movement when each intermediate pulley contacts the motor shaft, an idler plate movably mounted upon the mounting plate, an idler wheel journalled upon the idler plate for contact with the turntable flange and for selective contact with the intermediate pulleys, and cooperating means upon the idler plate and the turret plate latch arm for moving the idler wheel out of contact with the intermediate pulleys when the turret plate is in non-latched position.

7. A plural speed changer motor for a flanged turntable, including a mounting plate, a motor carried by the mounting plate and having a shaft, a turret plate pivotally mounted upon the mounting plate, a plurality of intermediate pulleys journalled upon the turret plate, means for moving the turret plate upon its pivot for moving the intermediate pulleys into selective contact with the motor shaft, there being spaced notches in the turret plate, corresponding in number and location to said intermediate pulleys, a turret plate latch arm pivotally mounted upon the mounting plate for engagement in said notches for latching the turret plate against movement when each intermediate pulley contacts the motor shaft, an idler plate movably mounted upon the mounting plate, an idler wheel journalled upon the idler plate for contact with the turntable flange and for selective contact with the intermediate pulleys, and cooperating means upon the idler plate and the turret plate latch arm for moving the idler wheel out of contact with the intermediate pulleys when the turret plate is in non-latched position.

8. A plural speed changer motor for a flanged turntable, including a mounting plate, a motor carried by the mounting plate and having a shaft, a turret plate movably mounted upon the mounting plate, a plurality of intermediate pulleys journalled upon the turret plate, means for moving the turret plate for moving the intermediate pulleys into selective contact with the motor shaft, there being spaced notches in the turret plate, corresponding in number and location to said intermediate pulleys, a turret plate latch arm mounted upon the mounting plate for engagement in said notches for latching the turret plate against movement when each intermediate pulley contacts the motor shaft, an idler plate movably mounted upon the mounting plate, an idler wheel journalled upon the idler plate for contact with the turntable flange and for selective contact with the intermediate pulleys, and a stud upon the idler plate for engagement with said turret plate latch arm for moving the idler wheel out of contact with the intermediate pulleys when the turret plate is in non-latched position.

9. A plural speed changer motor for a flanged turntable, a shaft upon the motor, a turret plate movable relative to the motor, a plurality of intermediate pulleys journalled upon the turret plate, means for moving the turret plate for moving the intermediate pulleys into selective contact with the motor shaft, means for latching the turret plate against movement when each intermediate pulley contacts the motor shaft, an idler plate movable relative to the turret plate, an idler wheel journalled upon the idler plate for contact with the turntable flange and for selective contact with the intermediate pulleys, and a stud upon the idler plate for engagement with said latching means for moving the idler wheel out of contact with the intermediate pulleys, when the turret plate is in non-latched position.

10. A plural speed changer motor for a flanged turntable, a shaft upon the motor, a turret plate movable relative to the motor, a plurality of intermediate pulleys journalled upon the turret plate, means for moving the turret plate for moving the intermediate pulleys into selective contact with the motor shaft, a turret plate latch arm for latching the turret plate against movement when each intermediate pulley contacts the motor shaft, an idler plate movable relative to the turret plate, an idler wheel journalled upon the idler plate for contact with the turntable flange and for selective contact with the intermediate pulleys, and a stud upon the idler plate for engagement with said turret plate latch arm for moving the idler wheel out of contact with the intermediate pulleys when the turret plate is in non-latched position.

11. A plural speed changer motor for a flanged turntable, including a mounting plate, a motor suspended from the mounting plate and having its shaft located through the mounting plate, a shifter lever fulcrumed upon the mounting plate, a turret plate pivotally mounted upon the mounting plate, a plurality of intermediate pulleys journalled upon the turret plate for selective contact with the motor shaft, means operatively connecting the shifter lever to the turret plate, arcuate edges upon the shifter lever and the turret plate, the arcuate edge upon the turret plate having notches therein corresponding in number and location to said intermediate pulleys, the arcuate edge upon the shifter lever having correspondingly arranged terminal shoulders and a central notch, latch arms for the shifter lever and the turret plate, means urging said latch arms into contact with said arcuate edges so as to engage the corresponding notches and shoulders in latched position when either of the intermediate pulleys is in contact with the motor shaft, an idler plate pivoted upon the mounting plate, an idler pulley journalled upon the idler plate for contact with the turntable flange and for selective contact with the intermediate pulleys, and means for moving the idler plate to hold the idler wheel out of contact with the intermediate pulleys when the parts are in non-latched position.

12. A plural speed changer motor for a flanged turntable, including a mounting plate, a motor suspended from the mounting plate and having its shaft located through the mounting plate, a shifter lever fulcrumed upon the mounting plate, a turret plate pivotally mounted upon the mounting plate, a plurality of intermediate pulleys journalled upon the turret plate for selective contact with the motor shaft, means operatively connecting the shifter lever to the turret plate, arcuate edges upon the shifter lever and the turret plate, the arcuate edge upon the turret plate having notches therein corresponding in number and location to said intermediate pulleys, the arcuate edge upon the shifter lever having correspondingly arranged terminal shoulders and a central notch, latch arms for the shifter lever and the turret plate, means urging said latch arms into contact with said arcuate edges so as to engage the corresponding notches and shoulders in latched position when either of the intermediate pulleys is in contact with the motor shaft, an idler plate pivoted upon the mounting plate, an idler pulley journalled upon the idler plate for contact with the turntable flange and for selective contact with the intermediate pulleys, and cooperating means upon the idler plate and one of said latch arms for moving the idler plate to hold the idler wheel out of contact with the intermediate pulleys when the parts are in non-latched position.

13. A plural speed changer motor for a flanged turntable, including a mounting plate, a motor suspended from the mounting plate and having its shaft located through the mounting plate, a shifter lever fulcrumed upon the mounting plate, a turret plate pivotally mounted upon the mounting plate, a plurality of intermediate pulleys journalled upon the turret plate for selective contact with the motor shaft, means operatively connecting the shifter lever to the turret plate, arcuate edges upon the shifter lever and the turret plate, the arcuate edge upon the turret plate having notches therein corresponding in number and location to said intermediate pulleys, the arcuate edge upon the shifter lever having correspondingly arranged terminal shoulders and a central notch, latch arms for the shifter lever and the turret plate, means urging said latch arms into contact with said arcuate edges so as to engage the corresponding notches and shoulders in latched position when either of the intermediate pulleys is in contact with the motor shaft, an idler plate pivoted upon the mounting plate, an idler pulley journalled upon the idler plate for contact with the turntable flange and for selective contact with the intermediate pulleys, and a stud upon the idler plate for engagement with the turret plate latch arm for moving the idler wheel out of contact with the intermediate pulleys when the turret plate is in non-latched position.

ANDREW F. DEMING.

REFERENCES CITED

The following references are of record in the file of this patent:

UNITED STATES PATENTS

| Number | Name | Date |
|---|---|---|
| 2,518,769 | Gay | Aug. 15, 1950 |
| 2,518,826 | Slough | Aug. 15, 1950 |